United States Patent [19]
Hermansson et al.

[11] Patent Number: 5,174,644
[45] Date of Patent: Dec. 29, 1992

[54] MIRROR AND ILLUMINATION UNIT FOR MOTOR VEHICLES

[75] Inventors: Bengt Hermansson; Sven Elfversson, both of Mullsjö, Sweden

[73] Assignee: Autopart Sweden AB, Malung, Sweden

[21] Appl. No.: 716,236

[22] Filed: Jun. 17, 1991

[30] Foreign Application Priority Data

Jun. 15, 1990 [SE] Sweden .............................. 9002133

[51] Int. Cl.[5] .............................................. B60Q 1/26
[52] U.S. Cl. ...................................... 362/83.1; 362/74; 362/142; 296/215
[58] Field of Search ................ 362/74, 83.1, 135, 142, 362/143, 80; 296/215, 37.7

[56] References Cited

U.S. PATENT DOCUMENTS

| | | | |
|---|---|---|---|
| 4,511,954 | 4/1985 | Marcus et al. | 362/74 X |
| 4,807,093 | 2/1989 | Cisler | 362/74 |
| 4,824,159 | 4/1989 | Fluharty et al. | 296/37.7 |
| 4,999,746 | 3/1991 | Svensson | 362/74 |
| 5,011,212 | 4/1991 | Viertel et al. | 362/74 X |
| 5,039,153 | 8/1991 | Lindberg et al. | 296/37.7 |

*Primary Examiner*—Stephen F. Husar
*Attorney, Agent, or Firm*—Young & Thompson

[57] ABSTRACT

Mirror and illumination unit for motor vehicles, comprising a shell (6) flush mounted in the vehicle ceiling (1). A panel (11) with a mirror (12) is hinged at the front edge of the shell (6). An illumination unit (10) is mounted at the rear edge of the shell. A screen (15) provided on the panel with light emitting slots (14) covers, when the panel is in its folded-up position, the illumination unit, so that the face directed lighting will be less when the mirror is in its folded-up position than when it is folded out.

7 Claims, 2 Drawing Sheets

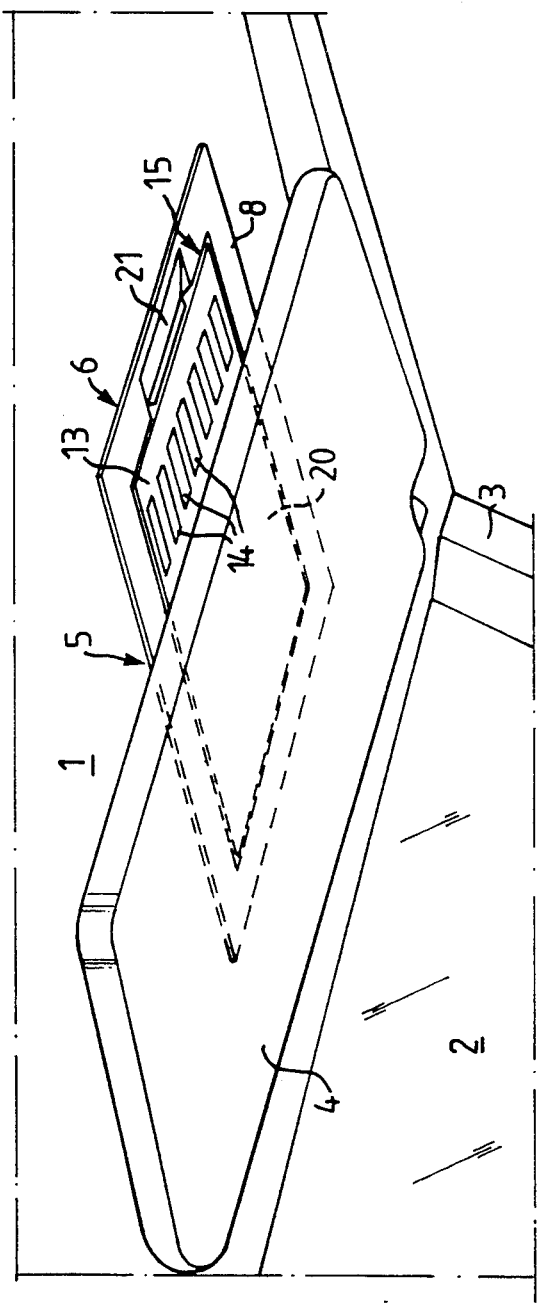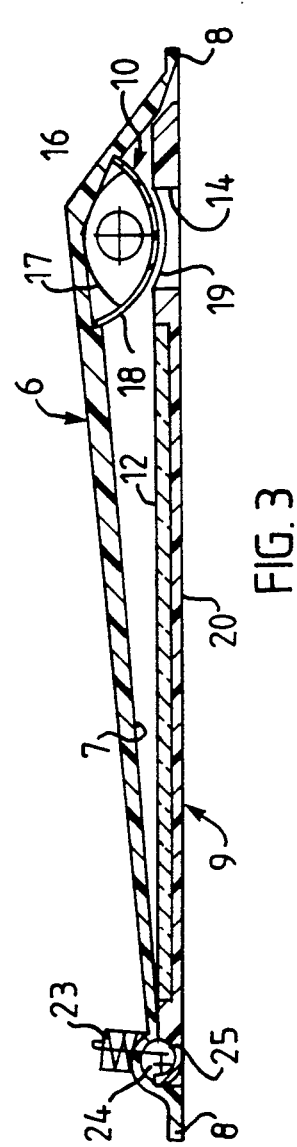

MIRROR AND ILLUMINATION UNIT FOR MOTOR VEHICLES

FIELD OF THE INVENTION

The present invention relates to a mirror and illumination unit for motor vehicles, comprising firstly a hinged mirror unit, which can be swung between a folded-out position, in which its mirror surface is exposed for use, and a folded-up position, in which its mirror surface is hidden behind the side of the unit opposite the mirror surface, and secondly an illumination unit, which is disposed adjacent to the mirror to direct light towards a user.

BACKGROUND OF THE INVENTION

In recent years, it has become more and more popular to equip the sun visors of passenger cars with mirror and illumination units. Such an installation makes the sun visor significantly heavier, which requires increased friction in the hinges of the sun visor and additional spring force in the snap mechanism normally holding the sun visor in the horizontal position. Lighting in the sun visor itself requires wiring to the sun visor itself and this increases complexity and thus the price.

The illumination units arranged in the sun visors cannot be used as general lighting in the vehicle but can only be used to direct light towards the person looking in the mirror.

It is also known to arrange a mirror on a panel which can be swung down from the ceiling of the vehicle. An illumination unit is placed to one side of the panel and comprises light sources both for general lighting and directed lighting. Such an installation is shown in GB B 2 177 980, for example. The illumination unit consists here of, on one hand, a fixed unit which is provided with a screen and is recessed mounted into the ceiling and, on the other hand, an adjustable spotlight arranged adjacent thereto.

SUMMARY OF THE INVENTION

The purpose of the present invention is in general to avoid the disadvantages of visor mounted mirror and illumination units by providing a simple and inexpensive mirror and illumination unit separate from the sun visor. The lighting can serve as a general lighting and as "make up" lighting. In general the purpose is to provide a mirror and illumination unit with a single lighting fixture, which is simple to adjust between different functions.

This is achieved according to the invention in a mirror and illumination unit of the type described by way of introduction by virtue of the fact that the mirror unit has shade or screen means adapted to the lighting in the illumination unit and is hinged in relation to the illumination unit so that the shade or screen means, when the mirror unit is in its folded-up position, cover at least a portion of the illumination unit to provide a certain diffusion of light from the illumination unit and, when the mirror unit is folded-out, are moved relative to the illumination unit to change the distribution of light.

Such ceiling mounted units placed above the passenger seat are suitably provided with screen or grill means, which, when disposed in front of the illumination unit, screen light from the passenger's face. Suitably an illumination unit is selected which when unscreened provides a relatively large diffusion of light so that, when uncovered, it directs a portion of the light towards the passenger's face. The design according to the invention provides for switching between screened light and light with greater diffusion automatically as the mirror is flipped down to its position for use.

BRIEF DESCRIPTION OF THE DRAWINGS

The invention will be described in more detail below with reference to examples shown in the accompanying drawings, FIG. 2 is a view corresponding to FIG. 1 with the mirror unit in its flipped-up storage position, and FIG. 3 shows a longitudinal section through the unit in FIG. 2.

DETAILED DESCRIPTION OF THE INVENTION

Figure 1:
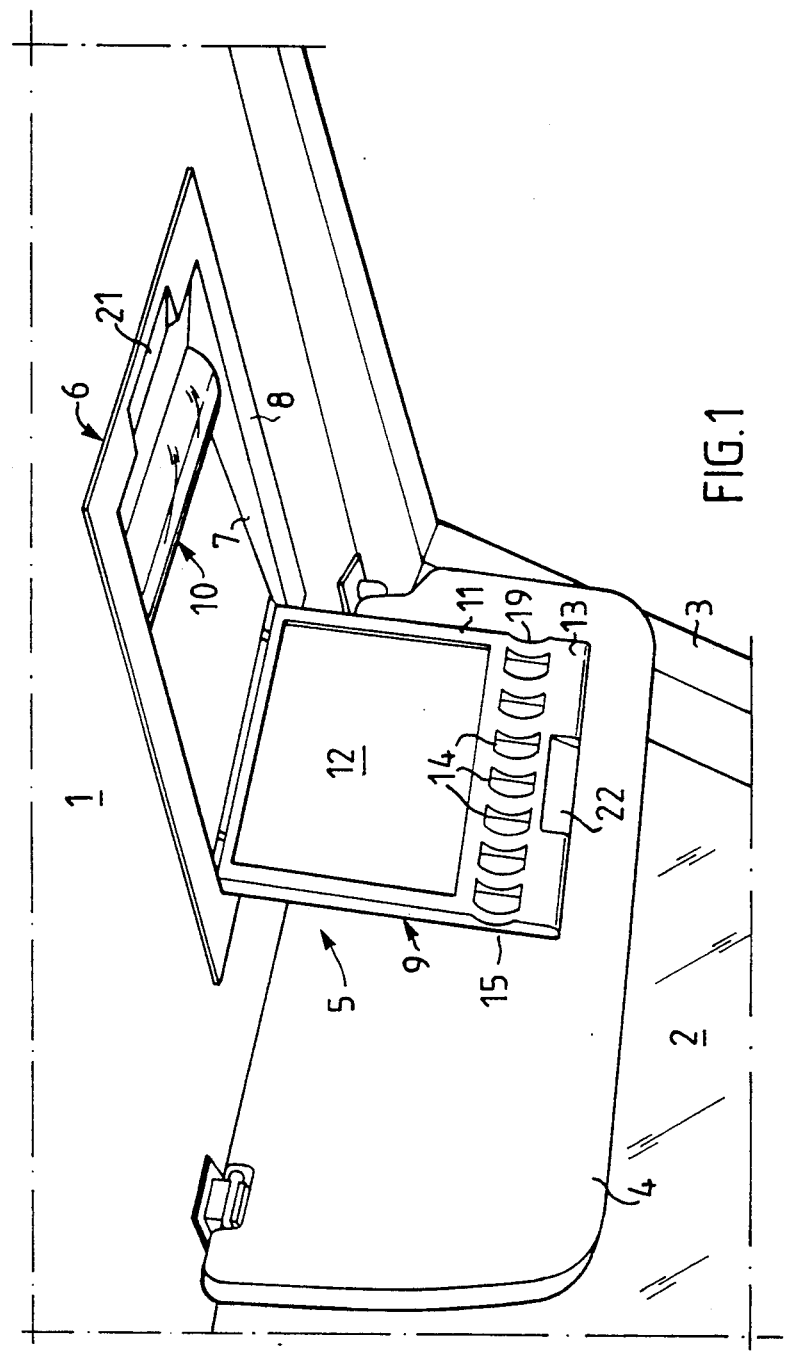
FIG. 1 shows a perspective view of one embodiment of a mirror and illumination unit according to the invention.

In the Figures, 1 generally designates a ceiling panel, 2 designates a windshield and 3 the right windshield post of a passenger car compartment. A sun visor 4 of conventional type is mounted at the top of the windshield.

A mirror and illumination unit 5 according to the invention is mounted in the ceiling 1 directly behind the sun visor 4. The unit 5 comprises a rectangular supporting element 6, preferably of moulded plastic, which has a rectangular recess 7 with a surrounding frame portion 8. The recess 7 is fitted into a cavity (not shown) in the ceiling panel 1 and the frame 8 overlaps the edge of the ceiling covering about the cavity to cover the edge.

At the front edge of the recess 7 in the supporting element 6, there is hingedly mounted a mirror unit 9 and an illumination 10 is fixed at the bottom of the recess 7 near the rear edge of the depression. The mirror unit 9 comprises a rectangular panel 11, preferably in plastic, which is hinged to either side of the depression, and a mirror 12 flush mounted in the hinge panel 11 and dimensioned so that a lower portion 14 (FIG. 1) of the hinged panel is free of the mirror.

The portion 13 has a plurality of parallel openings or slots 14 and forms a screen 15 for the illumination unit 5. The screen 15, when the flap 11 is in its folded-up position (FIG. 2), lies directly in front of the illumination unit 5 and acts to screen the light so that only narrow downwardly directed beams are emitted which do not dazzle the passenger.

The illumination unit 10 comprises a lamp holder (not shown in more detail here) with one or more tube lamps 16, a reflector 17 and a transparent cover 18 with an arcuate cross-section. The panel portion 13 is provided in the area of the slots 14 with a channel 19 adapted to the shape of the cover 18 so that the panel 11 can be folded-up so far that its downwardly (FIG. 2) facing surface 20 is flush with or at least essentially flush with the downwardly facing surface of the frame portion 8. At their rear edges, the frame 8 and the panel 11 are provided with recesses 21 and 22, respectively, providing a finger grip to facilitate flipping down of the mirror unit. When the mirror unit 5 is in its folded-up position, a spring 23 biased ball 24 lies in a socket-shaped recess 25 in the panel 11, thus keeping it in the folded-up position. As can be seen in FIG. 2, the mirror and illumination unit is placed so close to the sun visor that when the sun visor is in its folded-up position, it covers most of the unit only revealing the illumination portion.

The screen portion with slots 14 described above can of course have a different design. For example, the individual slots can be replaced by a larger opening with a screen which refracts the light in the desired manner. Furthermore, a lens mounted in the portion 13 can be used to focus the light and provide a concentrated beam of light for map reading, for example. In the following patent claims, the term "shade or screen means" is intended to encompass the shade or screen means described in combination with the lens arrangement.

We claim:

1. Mirror and illumination unit for motor vehicles, comprising firstly a hinged mirror unit, which can be swung between a folded-out position, in which its mirror surface is exposed for use, and a folded-up position, in which its mirror surface is hidden behind the side of the unit opposite the mirror surface, and secondly an illumination unit, which is disposed adjacent to the mirror to direct light towards a user, said mirror unit (9) having screen means (15) associated with the lighting (10) in the illumination unit, said mirror unit being hinged in relation to the illumination unit at one side beside a recess (7) adapted to the shape of the mirror unit, into which recess the mirror unit can be folded to conceal the mirror surface, so that the screen means cover at least a portion of the illumination unit to provide a certain dispersion of light from the illumination unit when the mirror unit is in its folded-up position, and when the mirror unit is folded out, the screen means are moved relative to the illumination unit to change the dispersion of light, said illumination unit (10) and said screen means (15) being disposed at or in the vicinity of a side of the recess or mirror unit opposite to said hinge.

2. Mirror and illumination unit according to claim 1, wherein the mirror unit (9) further includes a rectangular panel (11) and a mirror (12) fixed to the panel, said panel being hinged at one edge to one edge of said recess (7) in a carrier (6) designed to be fixed in a vehicle ceiling.

3. Mirror and illumination unit according to claim 2, wherein the illumination unit (10) is housed in the recess (7) and that the panel (11) is hinged so that in its folded-up position, its side (20) opposite the mirror lies essentially coplanar with the edge (8) of the recess.

4. Mirror and illumination unit according to claim 3, wherein the side of the screen means (15) facing away from the illumination unit (10) lies essentially coplanar with the edge (8) of the recess (7), when the panel (11) is in its folded-up position.

5. Mirror and illumination unit according to claim 1, wherein the screen means (15) is disposed to at least limit the dispersion of light backwards as seen in the longitudinal direction of the vehicle, when the mirror unit (9) is swung from its folded-out to its folded-in position.

6. Mirror and illumination installation in motor vehicles, comprising a hinged mirror unit, which can be swung between an essentially vertical use position extending downwards from a ceiling of a vehicle and an essentially horizontal position, in which the mirror surface faces the vehicle ceiling, and an illumination unit, which is mounted adjacent the mirror to direct light towards the user, said mirror unit (9) being hinged at a front edge as seen in the longitudinal direction of the vehicle, of a recess (7) in a carrier (6) flush mounted in the vehicle, said illumination unit (10) being mounted at the rear edge of said recess (7), and a screen device (15) mounted at the lower edge of the mirror unit when it is in its vertical position so that when the mirror unit is swung to its horizontal position, the screen device is moved into the beam of light from the illumination unit to at least limit the rearward dispersion of light.

7. Mirror and illumination installation according to claim 6, wherein the carrier (6) is mounted in the forward ceiling portion of the vehicle, so that, when in its horizontal position, the mirror unit (9) with the exception of the screen device (15), is hidden behind a sun visor (4) folded up against the ceiling.

* * * * *